US011293349B2

(12) United States Patent
Livebardon et al.

(10) Patent No.: US 11,293,349 B2
(45) Date of Patent: Apr. 5, 2022

(54) AIRCRAFT TURBOMACHINE EQUIPPED WITH A THERMOACOUSTIC SYSTEM (71) Applicant: Airbus Operations SAS, Toulouse (FR)

(72) Inventors: Thomas Livebardon, Toulouse (FR); Maxime Zebian, Toulouse (FR)

(73) Assignee: AIRBUS OPERATIONS SAS, Toulouse (FR)

(*) Notice: Subject to any disclaimer, the term of this patent is extended or adjusted under 35 U.S.C. 154(b) by 0 days.

(21) Appl. No.: 17/158,982

(22) Filed: Jan. 26, 2021

(65) Prior Publication Data
US 2021/0231057 A1 Jul. 29, 2021

(30) Foreign Application Priority Data
Jan. 28, 2020 (FR) ........................................ 2000797

(51) Int. Cl.
F02C 7/24 (2006.01)
F02C 7/14 (2006.01)

(52) U.S. Cl.
CPC ................. F02C 7/24 (2013.01); F02C 7/14 (2013.01); F05D 2220/323 (2013.01); F05D 2260/213 (2013.01); F05D 2260/96 (2013.01)

(58) Field of Classification Search
CPC .......... F02C 7/24; F02C 7/14; F05D 2260/96; F05D 2260/208; F05D 2260/213
See application file for complete search history.

(56) References Cited

U.S. PATENT DOCUMENTS

| 2008/0053099 | A1* | 3/2008 | Venkataramani | ....... F01D 25/18 60/772 |
| 2010/0095648 | A1* | 4/2010 | Zhang | ...................... F02C 6/18 60/39.182 |
| 2013/0160758 | A1* | 6/2013 | Kuo | ......................... F24S 80/70 126/635 |
| 2014/0165570 | A1* | 6/2014 | Herring | ..................... F02C 7/14 60/730 |

(Continued)

FOREIGN PATENT DOCUMENTS

| EP | 3038101 A1 | 6/2016 |
| EP | 3244039 A1 | 11/2017 |
| WO | WO-2016102691 A2 * | 6/2016 ........... G10K 11/172 |

OTHER PUBLICATIONS

English translation wo-2016102691, Jun. 2016.*
French Search Report; priority document.

Primary Examiner — Todd E Manahan
Assistant Examiner — Rodolphe Andre Chabreyrie
(74) Attorney, Agent, or Firm — Greer, Burns & Crain, Ltd.

(57) ABSTRACT

A turbomachine for an aircraft, comprising a thermoacoustic system associated with a fluid circuit that serves to supply the engine of the turbomachine with fluid. The thermoacoustic system comprises an exchanger which is connected to the fluid circuit and in which there flows a fluid that is to be cooled, an acoustic attenuation structure which is distinct from the exchanger and which forms all or part of a wall of the fan duct, and at least one heat-duct tube comprising a portion that is entirely received in the acoustic structure and a portion with an end that is received in the exchanger, and a single curved elbow with a non-zero angle between the two portions.

10 Claims, 5 Drawing Sheets (56) References Cited

U.S. PATENT DOCUMENTS

| | | |
|---|---|---|
| 2016/0017810 A1 | 1/2016 | Lord et al. |
| 2017/0159566 A1 | 6/2017 | Sennoun et al. |
| 2017/0314471 A1* | 11/2017 | Sennoun .................. F02C 7/06 |
| 2017/0363094 A1* | 12/2017 | Kumar .................. F04D 27/002 |
| 2020/0049071 A1* | 2/2020 | Heenen .................... F02C 7/14 |
| 2020/0217272 A1* | 7/2020 | Gangloff, Jr. ........ F23M 20/005 |

\* cited by examiner

AIRCRAFT TURBOMACHINE EQUIPPED WITH A THERMOACOUSTIC SYSTEM

CROSS-REFERENCES TO RELATED APPLICATIONS

This application claims the benefit of the French patent application No. 2000797 filed on Jan. 28, 2020, the entire disclosures of which are incorporated herein by way of reference.

FIELD OF THE INVENTION

The present invention relates to an aircraft turbomachine equipped with a thermoacoustic system for cooling the fluids needed for the operation of the turbomachine and for attenuating the noise emitted during the operation.

BACKGROUND OF THE INVENTION

A bypass turbomachine has a fan duct through which the air blown by the fan of the turbomachine passes to ultimately be ejected at the exhaust of the turbomachine. The fan duct is delimited by walls which duct the air. These walls are formed of acoustic attenuation structures which attenuate the sound waves generated by the flowing of the air through the fan duct and thus make it possible to deaden the noise of the turbomachine.

The walls may also be fitted with heat exchangers of the finned type used to perform an exchange of heat between the air circulating in the fan duct and pipes transporting fluids used in the operation of the turbomachine (for example oil, aviation fuel), so as to cool the latter.

Now, installing heat exchangers in the walls of the fan duct decreases the surface area assigned to acoustic treatment and therefore the ability of the acoustic treatment to deaden the noise of the turbomachine. Moreover, the fins of the heat exchangers generate an additional drag in the fan duct, which impairs the aerodynamic performance of the turbomachine.

In order to resolve these problems, document EP3038101 discloses a thermoacoustic system comprising an acoustic attenuation structure of the honeycomb type, in which there are arranged pipes transporting fluids that are to be cooled. The acoustic attenuation structure comprises perforations allowing the air of the fan duct to enter cavities of the attenuation structure, which form acoustic resonators. The air also serves to cool the pipes integrated into the acoustic attenuation structure, and therefore serves for cooling the fluids.

This solution, while effective, has the drawback that the pipes take up a significant portion of the thickness of the acoustic attenuation structure, which reduces the ability of the resonators to attenuate the sound waves.

One of the aims of the present invention is to identify a thermoacoustic system that does not have the above-mentioned drawbacks.

SUMMARY OF THE INVENTION

To that end, the invention relates to a bypass turbomachine for an aircraft, comprising a engine provided for turning a fan, an annular inter-duct element that is concentric with the engine, a nacelle that is concentric with the inter-duct element, the inter-duct element and the nacelle defining between them a fan duct in which there flows an air flow; at least one fluid circuit configured to make a fluid move towards or out of the engine; the turbomachine comprising a thermoacoustic system associated with a fluid circuit, the thermoacoustic system comprising an exchanger which is connected to the fluid circuit and in which there flows a fluid that is to be cooled, an acoustic attenuation structure which is distinct from the exchanger and which forms all or part of a wall of the fan duct, and at least one heat-duct tube comprising a portion that is entirely received in the acoustic structure and a portion with an end that is received in the exchanger, and a single curved elbow with a non-zero angle between the two portions.

BRIEF DESCRIPTION OF THE DRAWINGS

The above-mentioned features of the invention, along with others, will become clearer upon reading the following description of an embodiment, the description being provided with reference to the appended figures, in which.

DETAILED DESCRIPTION OF THE PREFERRED EMBODIMENTS

Figure 1:
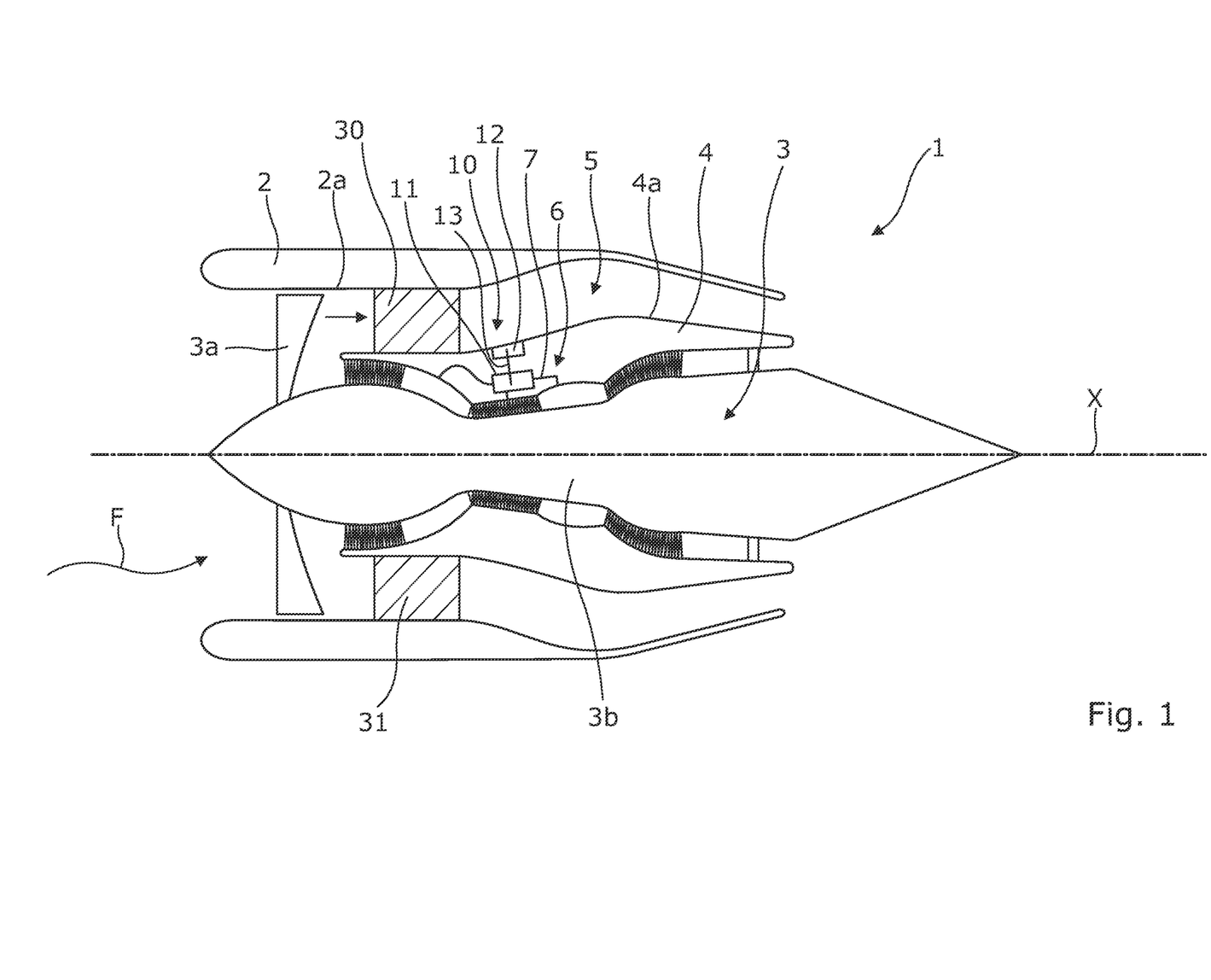
FIG. 1 is a schematic view, in section along the longitudinal axis, of a turbomachine equipped with a thermoacoustic system according to one embodiment of the invention.

With reference to FIG. 1, a bypass turbomachine 1 of an aircraft (not shown) comprises an annular nacelle 2 that is centered on a longitudinal axis X (termed engine axis) and surrounding a engine 3.

In the direction of flow of an air flow (arrow F) passing through the turbomachine 1 when the latter is in operation, the engine 3 comprises, from upstream to downstream and centered on the engine axis X, a fan 3a, and a engine body 3b which serves to turn the fan 3a when the engine 3 is running.

The turbomachine 1 further comprises, downstream of the fan 3a, an annular inter-duct element 4 that is concentric with the engine body 3b.

The nacelle 2 surrounds the inter-duct element 4, with which it is concentric. The inner wall 2a of the nacelle 2 forms, with the outer wall 4a of the inter-duct element, the walls of a fan duct 5 that extends along the engine axis X and continues as far as the rear of the nacelle 2, where the air is ejected.

The nacelle 2 and the inter-duct element 4 are connected to one another by two diametrically opposite bifurcations 30, 31 (one at 12 o'clock and one at 6 o'clock), with each bifurcation 30, 31 extending radially in the fan duct 5. Thus, each bifurcation 30, 31 has a skin exposed to the air flow F passing through the fan duct 5.

The turbomachine 1 comprises a fluid circuit 6 for supplying the engine 3 with a fluid L (not shown in FIG. 1) that is necessary for operation of the engine, for example oil. The fluid circuit 6 comprises, in particular, pipes 7 in which the fluid L flows towards or out of the engine 3.

The operation of the engine 3 causes the temperature of the fluid L to rise. The turbomachine 1 comprises a thermoacoustic system 10 which is associated with the fluid circuit 6 and which serves for cooling the fluid L heated by the operation of the engine, but which also serves for attenuating the acoustic waves generated by the flow of the air in the fan duct 5.

Figure 2:
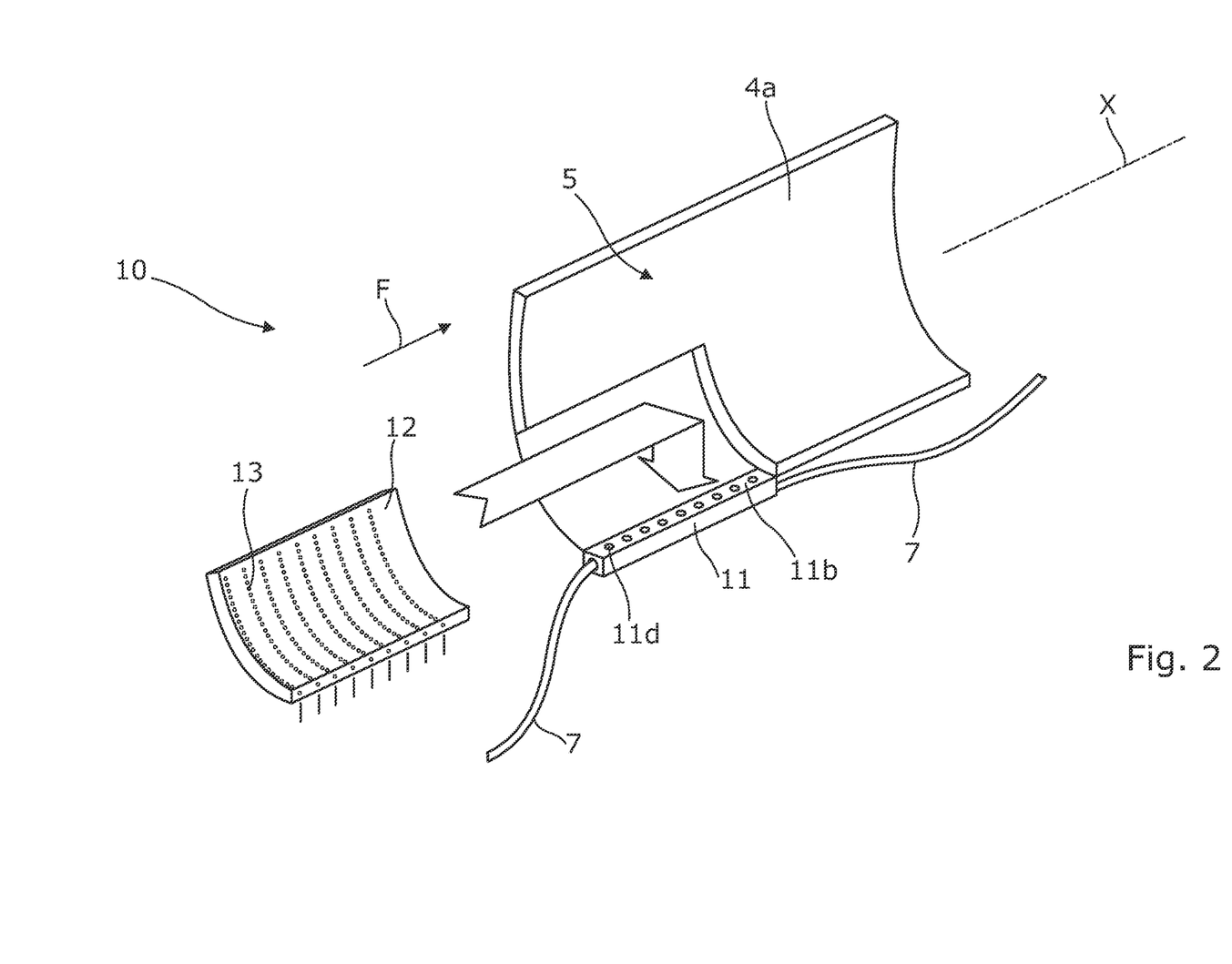
FIG. 2 is an exploded schematic view of the thermoacoustic system shown in FIG. 1, the system comprising an acoustic attenuation structure and an exchanger that are connected by a plurality of heat-duct tubes according to one embodiment of the invention.
Figure 3:
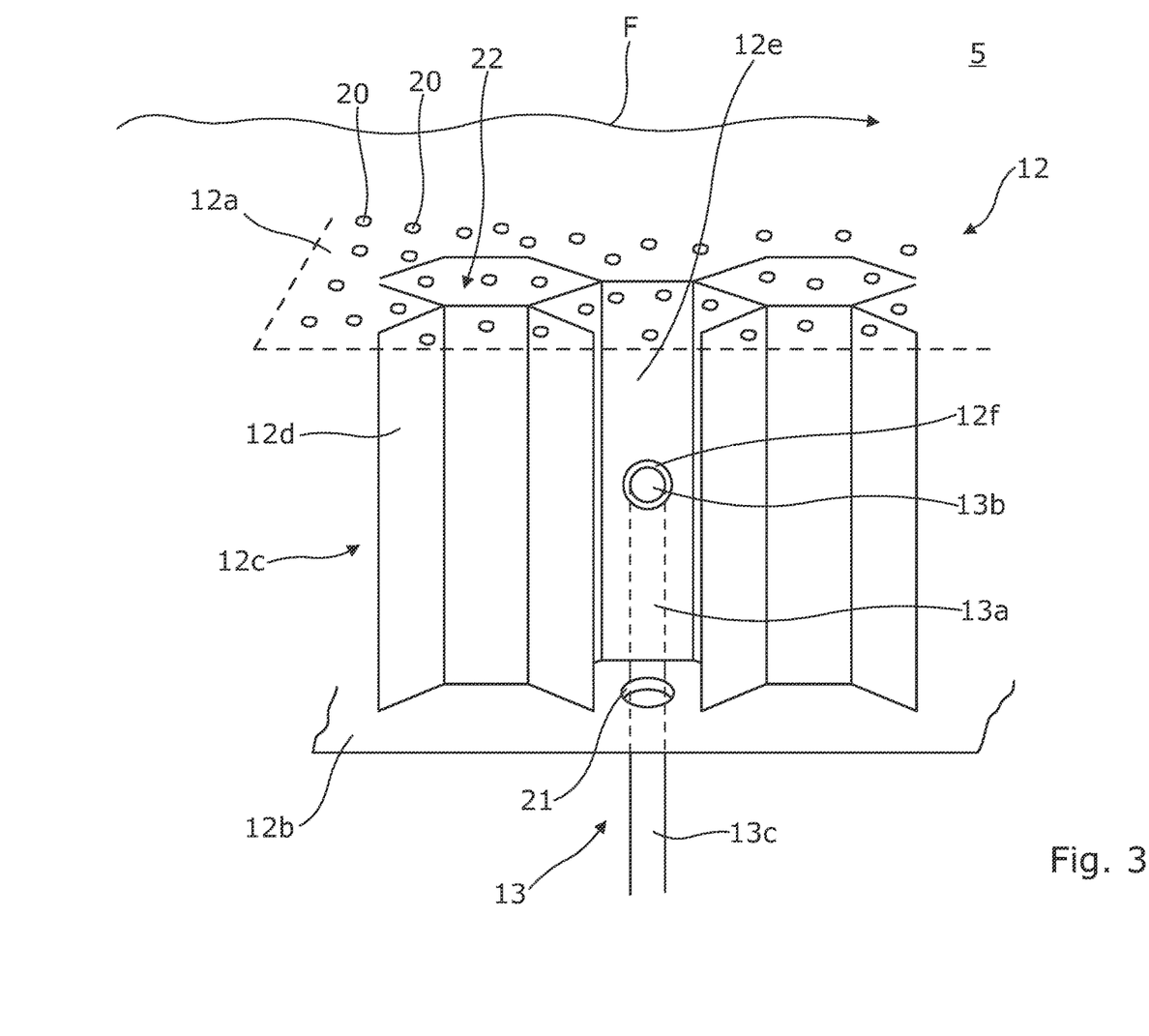
FIG. 3 is a schematic view of an acoustic attenuation structure of the thermoacoustic system of FIG. 2, according to one embodiment of the invention.
Figure 4:
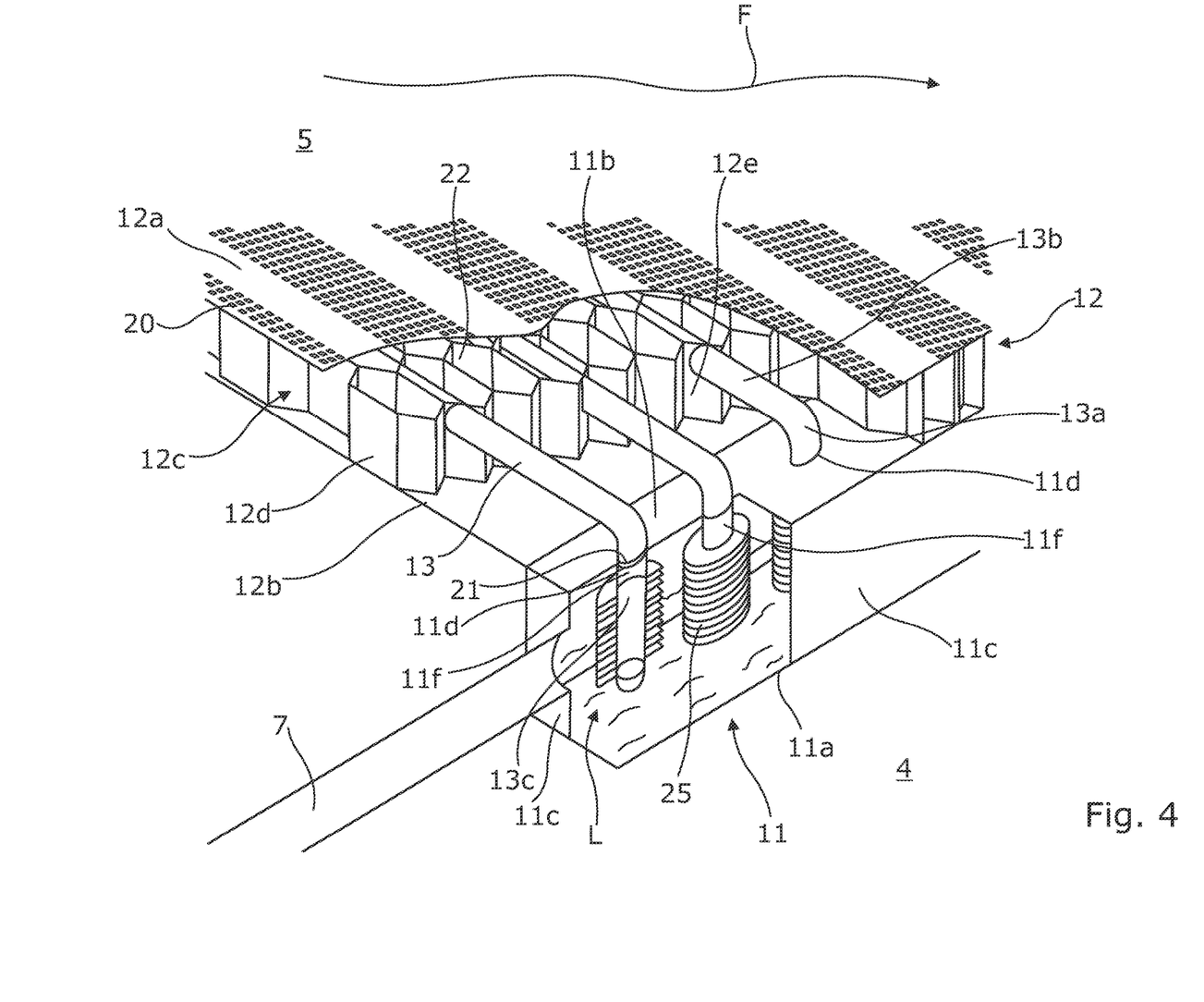
FIG. 4 is a detail view showing an arrangement of the thermoacoustic system of FIG. 1, according to one embodiment of the invention.

According to one embodiment of the invention, and in relation to FIGS. 2 to 4, the thermoacoustic system 10 comprises:

an exchanger 11 which is connected to a fluid circuit 6 and in which there flows a fluid L that is to be cooled;

an acoustic attenuation structure 12 which is distinct from the exchanger 11 and which forms all or part of a wall of the fan duct in order to attenuate the acoustic waves generated by the flow of the air in the fan duct 5, and at least one heat-duct tube 13 which connects the acoustic attenuation structure 12 to the exchanger 11, the heat-duct tube 13 comprising a first portion 13b that is entirely received in the acoustic structure 12 and a second portion 13c with an end that is received in the exchanger 11, and a single curved elbow with a non-zero angle 13a between the two portions.

It will be noted that, in the example shown in FIGS. 2 to 4, the exchanger 11 and the acoustic attenuation structure 12 are arranged in the thickness of the inter-duct element 4 and the acoustic attenuation structure 12 forms part of the outer wall 4a of the inter-duct element 4. Moreover, in this example, the thermoacoustic system 10 comprises a plurality of heat-duct tubes 13 whose elbows 13a are curved at 90°.

With reference to FIG. 3, the acoustic attenuation structure 12, of the honeycomb type, comprises a first panel 12a, a second panel 12b that is at a distance from the first panel, and a core 12c that is interposed between the two panels and within which is arranged the elbow 13a of each heat-duct tube 13 as well as the first portion 13b of the heat-duct tube 13.

The first panel 12a is in direct contact with the air flow F flowing in the fan duct 5 and has perforations 20 that are dimensioned in such a way that part of the air flow F driven by the fan 3a can enter the core 12c so as to promote acoustic resonance in the core and dissipate all or part of the corresponding energy.

The second panel 12b comprises orifices 21 through which the heat-duct tubes 13 can pass, with one orifice 21 per heat-duct tube 13. The interface between each heat-duct tube 13 and the second panel 12b at an orifice 21 is sealed using any appropriate means such as a seal or a sealing compound.

The core 12c consists of a plurality of structural partitions 12d which extend between the first and second panel 12a, 12b and which are attached to each of the panels in order to provide the acoustic attenuation structure 12 with mechanical strength. The plurality of structural partitions 12d forms, with the two panels, a network of acoustic cavities 22 extending between the two panels, where each acoustic cavity 22 communicates with the fan duct 5 via the perforations 20 created in the first panel 12a.

Some structural partitions 12e, termed support partitions, support the heat-duct tubes 13 that are received in the acoustic attenuation structure 12 in order to ensure the structural integrity of the assembly made up of the heat-duct tubes and the acoustic attenuation structure. A support partition 12e is, for example, a partition which is attached to both of the panels 12a,b and has an orifice 12f through which a heat-duct tube passes.

The exchanger 11 is in the form of a hollow solid, parallelepipedal in shape, having a bottom wall 11a, termed bottom, and a wall forming a lid 11b, termed lid, these being mutually parallel and connected to one another by four lateral walls 11c in parallel pairs, all perpendicular to the bottom 11a and to the lid 11b. The lid 11b comprises through-orifices 11d, and a sheath 11f is arranged in each of the through-orifices and is welded in a leaktight manner to the lid 11b. Each sheath is intended to receive the second portion 13c of the heat-duct tube 13 and has, to that end, a hollow cylindrical shape extending longitudinally in the thickness of the exchanger 11, from the lid 11b towards the bottom 11a. Alternatively, the lid 11b is drawn so as to form the sheathes 11f.

A finned exchanger 25 is preferably arranged around the sheath 11f in that part of the sheath 11f that is intended to be in contact with the fluid L that is to be cooled. The finned exchanger 25 serves to promote the exchange of heat between the fluid L contained in the exchanger 11 and the heat-duct tube 13.

In order for the fluid L that is to be cooled to pass through the exchanger 11, two lateral walls 11c, preferably facing one another, are each equipped with a fluidic connector (not shown) that serves for connecting a pipe 7 of the fluid circuit 6 with which the exchanger 11 is associated. Thus, the fluid L of the fluid circuit 6, under the action of a pump (not shown) of the circuit, is discharged into the exchanger enclosure 11 through the first fluidic connector that is connected to a first pipe 7, flows in the exchanger 11 in a fluid flow direction defined by the pump, and leaves the exchanger 11 through the second fluid connector that is connected to a second pipe 7.

Each heat-duct tube 13 is in the form of a hollow tube that is circular, elliptical or parallelepipedal in shape. The heat-duct tube 13 is sealed and is filled with a heat transfer fluid in liquid/vapor thermodynamic equilibrium.

It will be noted that, in the example depicted in FIGS. 1 to 4, the exchanger 11 and the acoustic attenuation structure 12 are contiguous, owing to space optimization requirements, since one of the walls of the exchanger 11 is in contact with the second panel 12b of the acoustic attenuation structure 12. It would be possible, without departing from the scope of the present invention, for the exchanger 11 and the acoustic attenuation structure 12 to be separated by a greater distance.

At the level of the acoustic attenuation structure 12, each heat-duct tube 13 passes through the second panel 12b at an orifice 21 and is supported by one or more support partitions 12e.

At the level of the exchanger 11, the second portion 11c of each heat-duct tube 13 is partially inserted into a sheath 11f.

In the case of a flow of air in the fan duct 5, the air flow F flows along the first panel 12a of the acoustic attenuation structure 12 and the perforations 20 ensure that some of the air F enters the acoustic cavities 22. Each acoustic cavity 22 acts as a quarter-wavelength resonator and serves to attenuate the sounds emitted by the air flowing in the fan duct 5.

The so-called cold end of the first portion 13b of the heat-duct tube 13, that is arranged in the acoustic attenuation structure 12, is swept by the air flow F driven by the fan 3a, whereas the so-called hot end of the second portion 13c of the heat-duct tube 13, that is received in the exchanger, is surrounded by the fluid L heated by the engine (oil drawn from the engine, or hydraulic liquid or jet fuel to be cooled).

From the thermal point of view, considering the heat circuit formed by a heat-duct tube 13, the exchanger 11 and the acoustic attenuation structure 12: the exchanger 11 forms an evaporator while the acoustic attenuation structure 12 forms a condenser. By way of example, when the fluid L that is to be cooled is oil, the temperature in the exchanger 11 is of the order of 100° C. while the temperature in the core 12c of the acoustic attenuation structure 12 is of the order of 50° C.

The temperature gradients between the hot end and the cold end of the heat-duct tube 13 gives rise to pressure gradients which bring about circulation of the heat transfer fluid, permitting a movement of mass and hence of heat between the condenser and the evaporator. Indeed, following a continuous cycle: the heat transfer liquid is heated in the evaporator and vaporizes and the resulting vapor moves towards the cold end of the heat-duct tube where it condenses, giving off the latent heat that it has absorbed. The resulting liquid returns, by gravity, towards the hot end of the heat-duct tube 13. Thus, in order to ensure proper operation of the thermoacoustic system 10, the acoustic attenuation structure 12 must be arranged higher than the exchanger 11.

The invention serves to remedy the drawbacks of the prior art since, for an equal diameter, a heat-duct tube 13 connecting an exchanger 11 to an acoustic attenuation structure 12, as described in the invention, ensures a better exchange of heat than the pipes directly containing a fluid that is to be cooled, integrated into the acoustic attenuation structure, as described in the prior art.

By way of example, and for an equivalent diameter, a heat-duct tube 13 (with water as the heat transfer fluid) arranged between an exchanger 11 and an acoustic attenuation structure 12 as described above can permit a radial flux per $cm^2$ of the order of 20 to 100 W, whereas a pipe directly containing a fluid that is to be cooled, arranged in an identical acoustic attenuation structure, can permit a radial flux per $cm^2$ of the order of 2 to 5 W.

Hence, the heat-duct tubes 13 can be provided with a smaller diameter than the pipes for equal or greater effectiveness. The use of small-diameter heat-duct tubes 13 makes it possible to free up more space in the thickness of the acoustic attenuation structure 12, and thus promote the attenuation of the soundwaves by the latter.

The heat-duct tube 13 is preferably provided with a capillary network arranged on the internal wall of the tube (that is to say, the wall in contact with the fluid) and created using various techniques which may be combined, such as the creation of grooves on the internal wall of the heat-duct tube 13 with grooves extending along the length of the heat-duct tube 13, or by metallic sintering arranged on the internal wall of the heat-duct tube 13.

When the heat-duct tube is provided with a capillary network, the liquid that is formed returns towards the hot end of the heat-duct tube 13 with the aid of capillary forces.

In this case, and in contrast to the above, when the heat-duct tube 13 is provided with a capillary network, the acoustic attenuation structure 12 need not necessarily be arranged higher than the exchanger 11 in order to guarantee operation of the thermoacoustic system 10, although such a configuration will optimize the efficiency of the thermoacoustic system 10. Indeed, the acoustic attenuation structure 12 and the exchanger 11 may be arranged at the same height.

The heat-duct tube 13 is made of a metallic material, such as copper, or of a composite material. The heat transfer fluid located inside the heat-duct tube 13 is a fluid that is compatible with aeronautics applications and with the extreme conditions experienced during flight (temperature, pressure, etc.), such as water, ammonia, ethanol or methanol. The heat transfer fluid takes up, for example, 50% of the total internal volume of the heat-duct tube 13.

The structural partitions 12d of the acoustic attenuation structure 12 are made of a metallic material or a composite material.

The exchanger 11 is made of a metallic material, such as titanium, aluminum, copper or stainless steel, or may also be made of a composite material.

Figure 5:
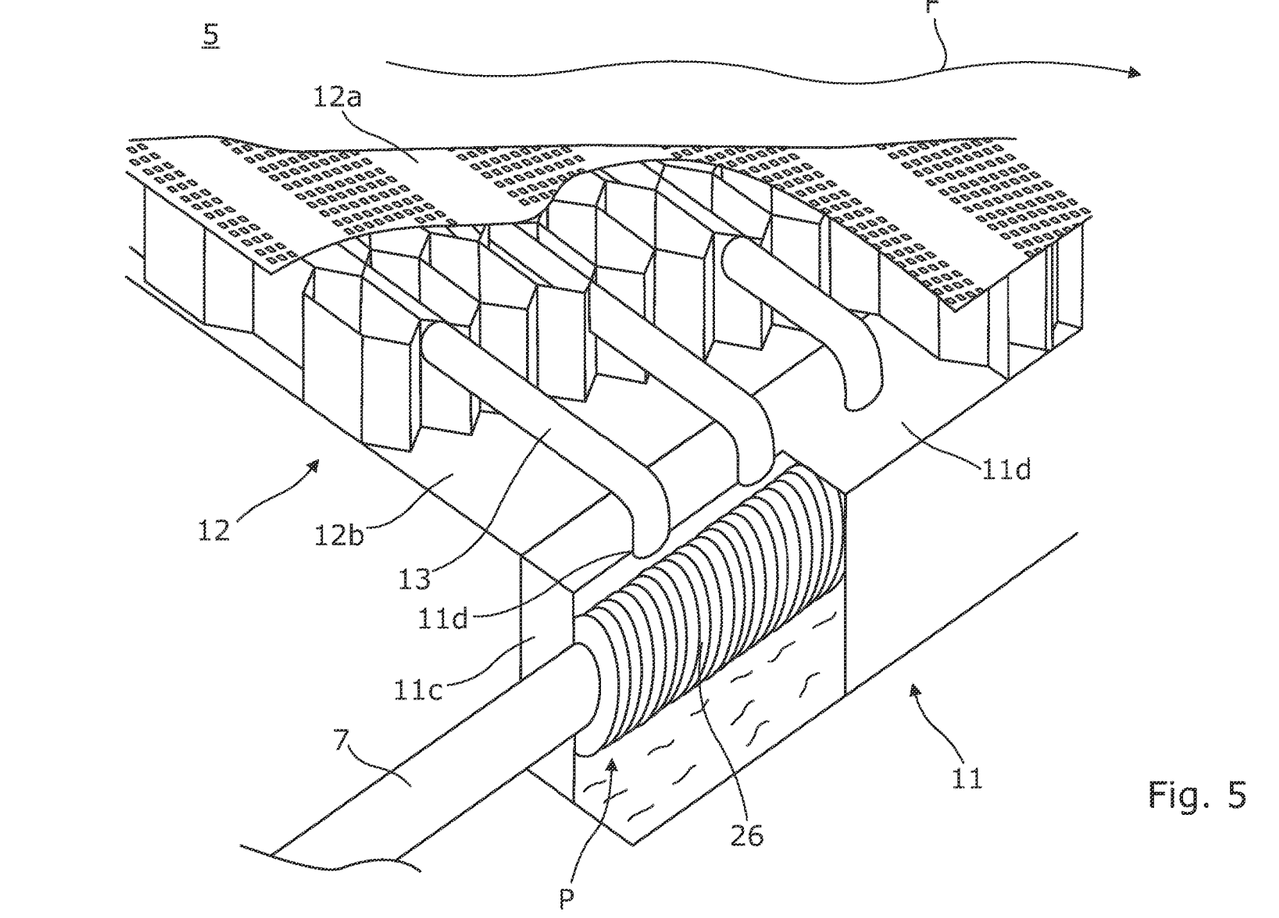
FIG. 5 is a view similar to FIG. 4, showing an arrangement of the thermoacoustic system of FIG. 1, according to another embodiment of the invention.

In a variant of the invention, and with reference to FIG. 5, the exchanger 11 is in the form as described above, with the exception that it does not have any sheathes 11f but only through-orifices 11d arranged on the lid 11b. The fluid L that is to be cooled remains confined in a pipe 7 of the fluid circuit 6 with which the exchanger 11 is associated.

Two lateral walls of the exchanger 11c, preferably facing one another, are each fitted with a fluidic connector (not shown) which serves for connecting a pipe 7 of the fluid circuit 6 in a leaktight manner Thus, a portion of the pipe 7 passes through the exchanger 11, through the fluidic connector.

The exchanger 11 is filled with a heat transfer fluid P which is a fluid that is compatible with aeronautics applications and with the extreme conditions experienced during flight (temperature, pressure, etc.).

At the level of the exchanger 11, the second portion 13c of each heat-duct tube 13 is partially inserted through a through-orifice 11d (with appropriate means for sealing the connection of the heat-duct tube 13 with the lid 11b of the exchanger 11) and is surrounded by the heat transfer fluid P contained in the exchanger 11.

A finned exchanger 26 is preferably arranged around that portion of the pipe 7 of the fluid circuit 6 that is contained in the exchanger in order to promote the exchange of heat between the heat transfer fluid contained in the heat-duct tube and the heat transfer fluid P contained in the exchanger 11.

The invention has been described for the case in which the exchanger 11 and the acoustic attenuation structure 12 are arranged in the thickness of the inter-duct element 4 and the acoustic attenuation structure 12 forms part of the outer wall 4a of the inter-duct element 4. The exchanger 11 and the acoustic attenuation structure 12 could equally be arranged in the thickness of the nacelle 2 or in the thickness of one of the bifurcations 30, 31 provided that the acoustic attenuation structure 12 is exposed to the air flow F passing through the fan duct 5.

Moreover, the acoustic attenuation structure 12 could form part of the inner wall 2a of the inter-duct element 4, but the exchanger could be arranged in a bifurcation 30, 31 or in the thickness of the inter-duct element 4. In this case, the heat-duct tubes 13 would pass through one of the bifurcations 30, 31.

Finally, the invention has been described in the case in which the elbow 13a of the heat-duct tube 13 is curved at 90°. However, the angle of the curved elbow 13a is chosen depending on the arrangement of the exchanger 11 relative to the acoustic attenuation structure 12, taking into account the space constraints linked to the proximity to other systems of the turbomachine 1. Thus, the angle of the curved elbow 13a is, for example, between 10° and 130°, the angular value of 90° being that which permits the most compact arrangement.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A bypass turbomachine for an aircraft, comprising:
an engine provided for turning a fan;
an annular inter-duct element concentric with the engine;
a nacelle concentric with the inter-duct element, the inter-duct element and the nacelle defining between them a fan duct in which there flows an air flow;
at least one fluid circuit configured to make a fluid move towards or out of the engine;
a thermoacoustic system associated with the at least one fluid circuit,
the thermoacoustic system comprising:
an exchanger connected to the fluid circuit and in which there flows the fluid that is to be cooled,
an acoustic attenuation structure distinct from the exchanger and which forms all or part of a wall of the fan duct, and
at least one heat-duct tube comprising a first portion entirely received in the acoustic structure and a second portion with an end received in the exchanger, and a single curved elbow with a non-zero angle between the first and second portions,
wherein the acoustic attenuation structure comprises:
a first panel in contact with the air flow flowing in the fan duct and having perforations;
a second panel comprising at least one orifice through which the at least one heat-duct tube is to pass; and
a core;
the core comprising:
a plurality of structural partitions forming, with the two panels, a network of acoustic cavities extending between the first and second panels, and where each acoustic cavity communicates with the fan duct via the perforations.

2. The turbomachine according to claim 1, wherein the angle of the curved elbow is 90°.

3. The turbomachine according to claim 1, wherein the heat-duct tube comprises a capillary network.

4. The turbomachine according to claim 1, wherein at least one structural partition, termed support partition, has an orifice through which the heat-duct tube passes.

5. The turbomachine according to claim 1, wherein the exchanger is formed as a hollow solid, parallelepipedal in shape, having a bottom wall, and a wall forming a lid, the bottom wall and the lid wall being mutually parallel and connected to one another by four lateral walls in parallel pairs, all perpendicular to the bottom wall and to the lid wall, the exchanger comprising a sheath arranged at a level of the lid wall and into which part of the second portion of each heat-duct tube is inserted.

6. The turbomachine according to claim 5, wherein a finned exchanger is arranged around the sheath.

7. The turbomachine according to claim 1, wherein the exchanger is formed as a hollow solid, parallelepipedal in shape, having a bottom wall, and a wall forming a lid, the bottom wall and the lid wall being mutually parallel and connected to one another by four lateral walls in parallel pairs, all perpendicular to the bottom wall and to the lid wall, the exchanger comprising a through-orifice arranged at a level of the lid and through which part of the second portion of each heat-duct tube is inserted.

8. The turbomachine according to claim 1, wherein the thermoacoustic system is arranged in the inter-duct element.

9. The turbomachine according to claim 1, wherein the exchanger is arranged in the inter-duct element and the acoustic attenuation structure is arranged in the nacelle.

10. The turbomachine according to claim 1, wherein the thermoacoustic system is arranged in the nacelle.

* * * * *